US009279704B2

(12) United States Patent
Kawamura et al.

(10) Patent No.: US 9,279,704 B2
(45) Date of Patent: Mar. 8, 2016

(54) OPTICAL ENCODER LIGHT SHIELDING PLATE, PRODUCING METHOD THEROF, AND OPTICAL ENCODER PROVIDED THEREWITH

(71) Applicant: OMRON Corporation, Kyoto-Shi, Kyoto (JP)

(72) Inventors: Rikuo Kawamura, Kyoto (JP); Hideaki Ozaki, Osaka (JP); Hirotada Teranishi, Osaka (JP); Takahiro Sakai, Shiga (JP)

(73) Assignee: OMRON Corporation, Kyoto (JP)

( * ) Notice: Subject to any disclaimer, the term of this patent is extended or adjusted under 35 U.S.C. 154(b) by 71 days.

(21) Appl. No.: 14/448,649

(22) Filed: Jul. 31, 2014

(65) Prior Publication Data

US 2015/0053851 A1     Feb. 26, 2015

(30) Foreign Application Priority Data

Aug. 23, 2013   (JP) .................... 2013-173638

(51) Int. Cl.
  *G01D 5/34*      (2006.01)
  *G01D 5/347*     (2006.01)
  *C25D 5/02*      (2006.01)

(52) U.S. Cl.
  CPC .............. *G01D 5/34707* (2013.01); *C25D 5/02* (2013.01); *G01D 5/3473* (2013.01)

(58) Field of Classification Search
  CPC .................... G01D 5/34707; G01D 5/3473
  USPC ............. 250/231.1, 231.13, 231.14, 237 G, 250/237 R; 205/102, 105
  See application file for complete search history.

(56) References Cited

U.S. PATENT DOCUMENTS

| 2002/0008195 A1* | 1/2002 | Aoki | G01D 5/34715 250/231.14 |
| 2010/0193671 A1* | 8/2010 | Oshida | C23C 18/54 250/231.1 |

FOREIGN PATENT DOCUMENTS

JP    2004-125734 A    4/2004

* cited by examiner

*Primary Examiner* — Kevin Pyo
(74) *Attorney, Agent, or Firm* — Osha Liang LLP

(57) ABSTRACT

An optical encoder light shielding plate has a plurality of bridge parts provided in parallel, each of the plurality of bridge parts having a metallic layer, and a slit formed between the plurality of bridge parts. The slit is configured to have light incident therefrom. In the metallic layer, a master-side surface on an exposed surface side of a conductive master body is arranged on a light incident direction side. The metallic layer is obtained such that a plurality of cavities are provided in parallel on the exposed surface of the conductive master body. A voltage is applied while the conductive master body is dipped in an electrolytic solution. The metallic layer is electrodeposited on the exposed surface of the conductive master body in the cavities.

20 Claims, 4 Drawing Sheets

OPTICAL ENCODER LIGHT SHIELDING PLATE, PRODUCING METHOD THEROF, AND OPTICAL ENCODER PROVIDED THEREWITH

BACKGROUND

1. Field

The present invention relates to an optical encoder, particularly to an optical encoder light shielding plate that turns or slides.

2. Related Art

Conventionally, for example, there is optical encoder light shielding plate 1 in which through-holes 3 are made in concentric with a center of turning shaft 2 as illustrated in FIG. 4. Light emitted from light source 4 and passes through through-hole 3 is detected by light receiving element 5, whereby a turning angle of turning shaft 2 is output as an output signal to a control device.

As to a method for producing the optical encoder light shielding plate, for example, Japanese Unexamined Patent Publication No. 2004-125734 discloses a method for producing a slit plate of an optical rotary encoder including a thin-film forming process of forming metallic thin films made of different metallic materials on both surfaces of a slit plate metallic base and a process of etching the metallic thin films and the metallic base to form a slit. In producing the slit plate, materials for the metallic thin films and the metallic base are selected such that an etching rate of the metallic thin film is lower than that of the metallic base.

However, in the optical rotary encoder slit plate producing method, the metallic thin films are formed on both the surfaces of the metallic base to obtain the slit plate having a three-layer structure. Therefore, production man-hours increase, and productivity is degraded.

Additionally, because the slit is formed by the etching process, it may be necessary to strictly perform time management in order to form the slit having high dimensional accuracy, and it takes time to produce the slit. Particularly, when the slit is formed by the etching process, a round surface is easily formed at an opening edge, and irregular reflection of the light is easily generated, which results in difficulty obtaining high measurement accuracy.

SUMMARY

One or more embodiments of the present invention provides an easy-to-produce optical encoder light shielding plate having high productivity and high measurement accuracy.

In accordance with one or more embodiments of the present invention, an optical encoder light shielding plate includes a slit between a plurality of bridge parts provided in parallel, light being incident from the slit, and the bridge parts include a metallic layer. In the metallic layer, a master-side surface on an exposed surface side of a conductive master body is arranged on a light incident direction side. The metallic layer is obtained such that a plurality of cavities are provided in parallel on the exposed surface of the conductive master body, a voltage is applied while the conductive master body is dipped in an electrolytic solution, and the metallic layer is electrodeposited on the exposed surface of the conductive master body in the cavities.

Accordingly, the optical encoder light shielding plate having a few production man-hours and high productivity is obtained because the metal is directly electrodeposited on the exposed surface of the conductive master to form the optical encoder light shielding plate.

Because the height of the bridge part can be controlled by adjusting a voltage application time, the time management is easily performed, and the production is relatively easily performed. Particularly, because the slit is not formed by etching, a round surface is hardly formed at the opening edge, and the irregular reflection of the light can be restrained. Therefore, the optical encoder light shielding plate having high measurement accuracy is obtained.

In the optical encoder light shielding plate, opposite surfaces of the bridge parts adjacent to each other may be inclined so as to extend outward in a direction toward an opening of the cavity from the exposed surface of the conductive master body.

Accordingly, because the light incident from the narrow opening of the slit is output without being irregularly reflected by the inside surfaces opposed to each other, disturbance decreases to improve the measurement accuracy.

In the optical encoder light shielding plate, an inclined angle of each of the inclined surfaces may be greater than 0 degrees and less than or equal to 30 degrees with respect to a direction in which the voltage is applied.

When the inclined angle is less than or equal to 0 degrees, possibly the incident light is irregularly reflected by the inside surfaces of bridge parts 15. When the inclined angle is greater than 30 degrees, a necessary width is not ensured in bridge part 15, and possibly adjacent slits 16 are coupled to each other.

In the optical encoder light shielding plate, a matte pattern provided on the exposed surface of the conductive master body may be transferred to one of surfaces of the bridge part.

Accordingly, because the matte pattern prevents the light from being irregularly reflected, the disturbance decreases to improve the measurement accuracy.

In the optical encoder light shielding plate, the optical encoder light shielding plate may be a rotary encoder light shielding plate or a linear encoder light shielding plate.

Accordingly, because the rotary encoder light shielding plate and the linear encoder light shielding plate can be selected as needed basis, the encoder light shielding plate usable in various applications is obtained.

In accordance with one or more embodiments of the present invention, a method for producing an optical encoder light shielding plate in which a slit is formed between a plurality of bridge parts arrayed, the method includes: providing a plurality of cavities in parallel on an exposed surface of a conductive master body; applying a voltage while dipping the conductive master body in an electrolytic solution; and forming the bridge part by electrodeposition of metal on the exposed surface of the conductive master body in the cavities.

Accordingly, the optical encoder light shielding plate having a few production man-hours and high productivity is obtained because the metal is directly electrodeposited on the surface of the conductive master to form the optical encoder light shielding plate.

Because the metal can be electrodeposited in proportion to the voltage application time, the time management is easily performed, and the production is relatively easily performed. Particularly, because the slit is not formed by etching, a round surface is hardly formed at the opening edge, and the irregular reflection of the light can be restrained. Therefore, the optical encoder light shielding plate having high measurement accuracy is obtained.

In accordance with one or more embodiments of the present invention, an optical encoder includes the optical encoder light shielding plate.

Accordingly, the optical encoder having the a few production man-hours and high productivity is obtained because the metal is directly electrodeposited on the surface of the conductive master to form the optical encoder light shielding plate.

Because the metal can be electrodeposited in proportion to the voltage application time, the time management is easily performed, and the production is relatively easily performed. Particularly, because the slit is not formed by etching, a round surface is hardly formed at the opening edge, and the irregular reflection of the light can be restrained. Therefore, the optical encoder having high measurement accuracy is obtained.

DETAILED DESCRIPTION

Hereinafter, embodiments of the present invention will be described with respect to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

An optical encoder light shielding plate according to one or more embodiments of the present invention will be described with reference to FIGS. 1A to 3B.

Figure 1A:
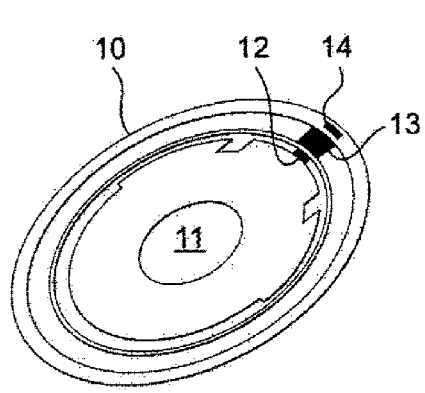
FIGS. 1A, 1B, and 1C are a perspective view, a front view, and a partially enlarged view, respectively, illustrating an optical encoder light shielding plate according to one or more embodiments of the present invention.
Figure 1B:
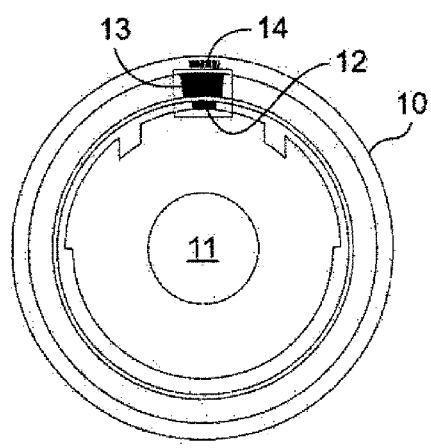

As illustrated in FIGS. 1A and 1B, optical rotary encoder light shielding plate 10 (hereinafter referred to as "light shielding plate 10") of one or more embodiments of the present invention has a thin disc shape formed by electroforming, and slit row bands 12, 13, and 14 are concentrically provided around center hole 11. For the sake of convenience, slit row bands 12, 13, and 14 are partially illustrated in FIGS. 1A and 1B.

Figure 1C:
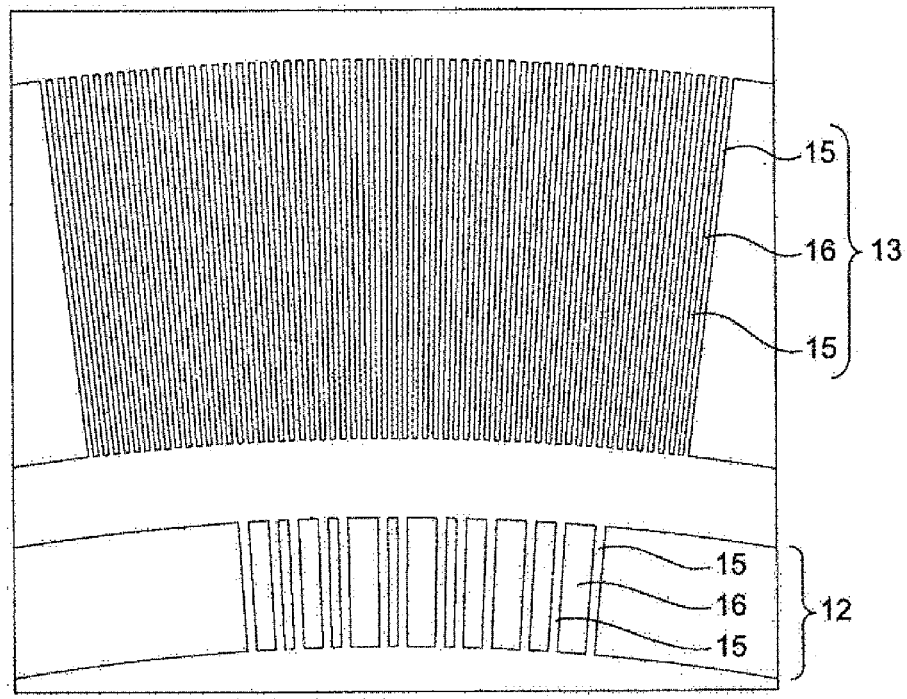
Figure 2A:
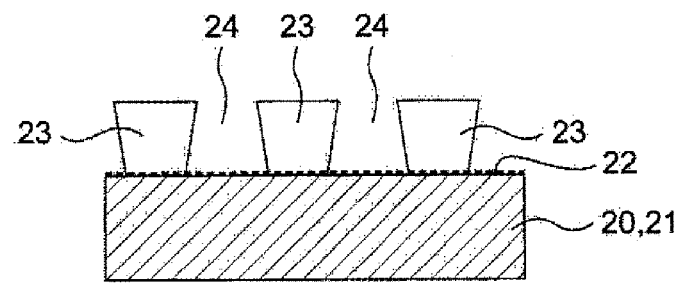
FIGS. 2A, 2B, and 2C are partially sectional views illustrating a production process.
Figure 2B:
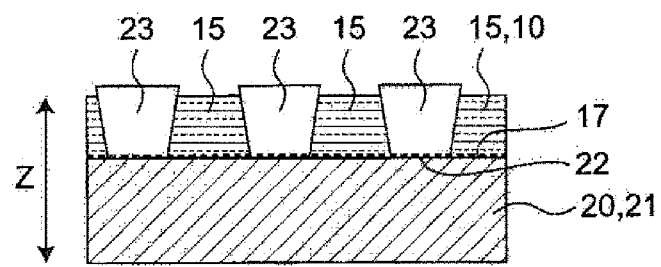
Figure 2C:
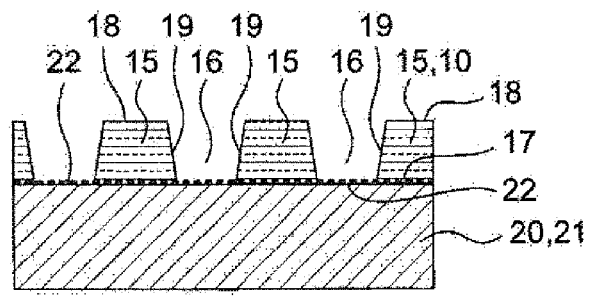

In slit row bands 12 and 13, as illustrated in FIG. 1C, a plurality of bridge parts 15 are radially formed to form slits 16, and slit 16 having a trapezoidal shape in section is formed between bridge parts 15 each having a trapezoidal shape in section (see FIG. 2C). A matte pattern provided on exposed surface 22 of master 20 is transferred to master-side surface 17 (see FIGS. 3A and 3B) of light shielding plate 10, and master-side surface 17 has a function of scattering light.

Each of slit row bands 12, 13, and 14 is not necessarily formed into a continuous toric shape, but slit row bands 12, 13, and 14 may be discontinuous slit row bands or a combination thereof as needed basis.

In bridge part 15, inclined angles of inside surfaces opposed to each other are each greater than 0 degrees and less than or equal to 30 degrees, preferably less than 5 degrees. When the inclined angle is less than or equal to 0 degrees, possibly incident light is irregularly reflected by the inside surfaces of bridge parts 15. When the inclined angle is greater than 30 degrees, a necessary width is not ensured in bridge part 15, and possibly adjacent slits 16 and 16 are coupled to each other. When the inclined angle is less than 5 degrees, the width of bridge part 15 can be shortened, so that a pitch between slits 16 and 16 adjacent to each other can finely be narrowed.

In one or more embodiments of the present invention, at the same time at which light shielding plate 10 is formed by the electroforming, the matte pattern is formed in master-side surface 17 of light shielding plate 10. Therefore, since a separate process is not necessary to form the matte pattern in light shielding plate 10, advantageously high productivity is achieved.

A method for producing light shielding plate 10 by the electroforming will be described below.

As illustrated in FIG. 2A, master 20 includes conductive master body 21 and resists 23 that are arranged by etching to be arrayed on exposed surface 22 of conductive master body 21.

Conductive master body 21 is made of a conductive material, and has a flat surface in which the matte pattern is formed. Exposed surface 22 of conductive master body 21 is not limited to the matte pattern, but exposed surface 22 may be formed of a simple flat surface.

As illustrated in FIG. 2A, resists 23 each having a trapezoidal shape in section are arranged by etching to be arrayed on exposed surface 22 of conductive master body 21, thereby forming cavities 24 each having a trapezoidal shape in section.

Master 20 is dipped in an electrolytic solution of an electrolytic cell, exposed surface 22 of conductive master body 21 is arranged so as to be opposed to a counter electrode (not illustrated), and a voltage is applied between conductive master body 21 and the counter electrode. Electrodeposition of metal in the electrolytic solution is generated on exposed surface 22 of conductive master body 21 in cavities 24 by applying the voltage between conductive master body 21 and the counter electrode. The voltage is further applied between conductive master body 21 and the counter electrode to continuously pass a current for depositing the metal in a voltage applying direction Z (see FIG. 2B). In front and rear surfaces of bridge part 15 formed by the deposited metallic layer, master-side surface 17 (see FIGS. 3A and 3B) that is the surface on the side of exposed surface 22 of conductive master body 21 has the matte pattern, and the surface on the opposite side to exposed surface 22 of conductive master body 21, namely, grown surface 18 that is the surface located near an opening of cavity 24 is made smooth.

Then, as illustrated in FIG. 2C, the voltage application is ended when a thickness of bridge part 15 reaches a predetermined value. Light shielding plate 10 in which slits 16 are formed each between bridge parts 15 including inclined surfaces 19 is obtained by removing resists 23.

In the producing method, exposed surface 22 of conductive master body 21 is wholly flat and has the matte pattern. However, exposed surface 22 is not necessarily wholly flat, but exposed surface 22 may partially be flat or have a smooth surface.

Exposed surface 22 may be wholly inclined or include a curved shape or a step.

In one or more embodiments of the present invention, the inclined angle of the inside surface of bridge part 15 can be controlled based on the voltage applying direction Z by adjusting the inclined angle of the inside surface of resist 23. That is, advantageously the use of the electroforming can not only easily form bridge part 15 including the accurate inclined surface but also obtain light shielding plate 10 having a high degree of freedom in design.

Figure 3A:
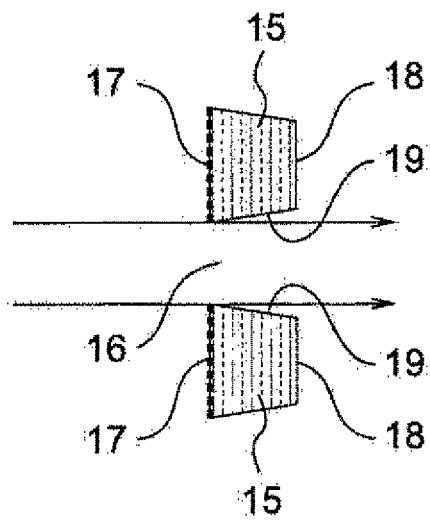
FIGS. 3A and 3B are partially sectional views illustrating a method for using an encoder according to one or more embodiments of the present invention.
Figure 3B:
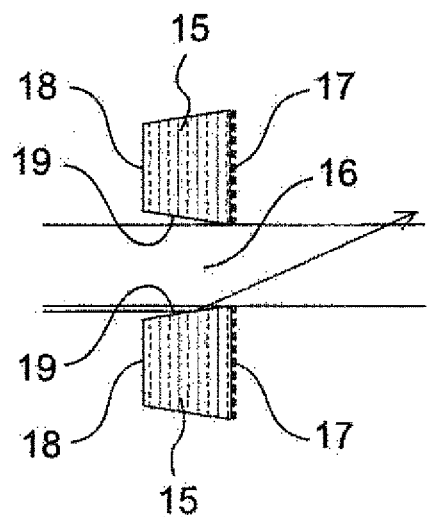
Figure 4:
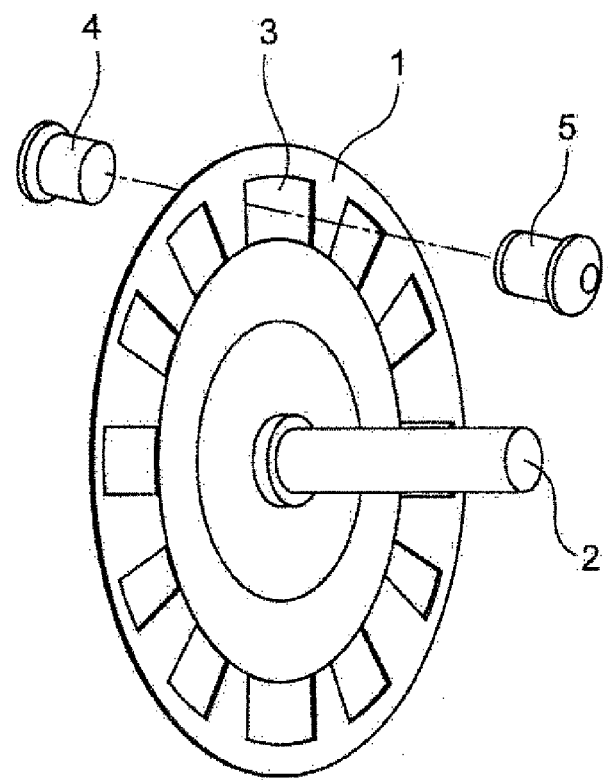
FIG. 4 is a perspective view illustrating a method for using a conventional optical rotary encoder light shielding plate.

In one or more embodiments of the present invention, as illustrated in FIG. 2C, the opposed surfaces of bridge parts 15 adjacent to each other constitute inclined surfaces 19 that are inclined to as to extend outward in a direction (that is, a direction toward the opening of cavity 24 from the exposed surface of conductive master body 21) toward the surface on the opposite side from the exposed surface side of conductive master body 21. As illustrated in FIG. 3A, inclined surfaces 19 are arranged so as to extend outward in a direction to a light output direction side from a light incident direction side. Therefore, as illustrated in FIG. 3B, an optical encoder having high resolution is obtained, because the light incident to slit 16 is output without being irregularly reflected by inclined surface 19.

In one or more embodiments of the present invention, when bridge part 15 is arranged so that master-side surface 17 having the matte pattern faces a light source side (not illustrated), namely, the light incident direction side, the light except the light passing through slit 16 is scattered by bridge part 15 on master-side surface 17 having the matte pattern, and does not become stray light in the optical encoder. Therefore, the optical encoder having higher resolution is obtained.

INDUSTRIAL APPLICABILITY

The optical encoder light shielding plate according to one or more embodiments of the present invention is not limited to the turning disc-shaped light shielding plate, but the optical encoder light shielding plate may be applied to a strip-shaped movable light shielding plate that is slidably movable or a disc-shaped or strip-shaped fixed light shielding plate that is not displaced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical encoder light shielding plate comprising:
   a plurality of bridge parts provided in parallel, each of the plurality of bridge parts comprising a metallic layer,
   a slit formed between the plurality of bridge parts,
   wherein the slit is configured to have light incident therefrom,
   wherein, in the metallic layer, a master-side surface on an exposed surface side of a conductive master body is arranged on a light incident direction side,
   wherein the metallic layer is obtained such that a plurality of cavities are provided in parallel on the exposed surface of the conductive master body,
   wherein a voltage is applied while the conductive master body is dipped in an electrolytic solution, and
   wherein the metallic layer is electrodeposited on the exposed surface of the conductive master body in the cavities.

2. The optical encoder light shielding plate according to claim 1, wherein opposite surfaces of the bridge parts adjacent to each other are inclined so as to extend outward in a direction toward an opening of the cavity from the exposed surface of the conductive master body.

3. The optical encoder light shielding plate according to claim 2, wherein an inclined angle of each of the inclined surfaces is greater than 0 degrees and less than or equal to 30 degrees with respect to a direction in which the voltage is applied.

4. The optical encoder light shielding plate according to claim 1, wherein a matte pattern provided on the exposed surface of the conductive master body is transferred to one of surfaces of the bridge part.

5. The optical encoder light shielding plate according to claim 1, wherein the optical encoder light shielding plate is a rotary encoder light shielding plate.

6. The optical encoder light shielding plate according to claim 1, wherein the optical encoder light shielding plate is a linear encoder light shielding plate.

7. A method for producing an optical encoder light shielding plate in which a slit is formed between a plurality of bridge parts arrayed, the method comprising:
   providing a plurality of cavities in parallel on an exposed surface of a conductive master body;
   applying a voltage while dipping the conductive master body in an electrolytic solution; and
   forming the plurality of bridge parts having the slit formed therebetween by electrodeposition of metal on the exposed surface of the conductive master body in the cavities.

8. An optical encoder comprising:
   the optical encoder light shielding plate according to claim 1.

9. The optical encoder light shielding plate according to claim 2, wherein a matte pattern provided on the exposed surface of the conductive master body is transferred to one of surfaces of the bridge part.

10. The optical encoder light shielding plate according to claim 3, wherein a matte pattern provided on the exposed surface of the conductive master body is transferred to one of surfaces of the bridge part.

11. The optical encoder light shielding plate according to claim 2, wherein the optical encoder light shielding plate is a rotary encoder light shielding plate.

12. The optical encoder light shielding plate according to claim 3, wherein the optical encoder light shielding plate is a rotary encoder light shielding plate.

13. The optical encoder light shielding plate according to claim 4, wherein the optical encoder light shielding plate is a rotary encoder light shielding plate.

14. The optical encoder light shielding plate according to claim 2, wherein the optical encoder light shielding plate is a linear encoder light shielding plate.

15. The optical encoder light shielding plate according to claim 3, wherein the optical encoder light shielding plate is a linear encoder light shielding plate.

16. The optical encoder light shielding plate according to claim 4, wherein the optical encoder light shielding plate is a linear encoder light shielding plate.

17. An optical encoder comprising:
   the optical encoder light shielding plate according to claim 2.

18. An optical encoder comprising:
   the optical encoder light shielding plate according to claim 3.

19. An optical encoder comprising:
   the optical encoder light shielding plate according to claim 4.

20. An optical encoder comprising:
   the optical encoder light shielding plate according to claim 5.

* * * * *